(12) United States Patent
Lee

(10) Patent No.: US 10,331,187 B2
(45) Date of Patent: Jun. 25, 2019

(54) SELECTIVELY CONTROLLING POWER TO A CONNECTOR PORT

(71) Applicant: Intel Corporation, Santa Clara, CA (US)

(72) Inventor: Kamal Lee, Taipei (TW)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 15/416,835

(22) Filed: Jan. 26, 2017

(65) Prior Publication Data

US 2018/0210526 A1 Jul. 26, 2018

(51) Int. Cl.
*G06F 1/26* (2006.01)
*G06F 1/3287* (2019.01)
*G06F 13/42* (2006.01)
*G06F 13/40* (2006.01)

(52) U.S. Cl.
CPC ............ *G06F 1/263* (2013.01); *G06F 1/3287* (2013.01); *G06F 13/4022* (2013.01); *G06F 13/4282* (2013.01)

(58) Field of Classification Search
CPC ....................................................... G06F 1/266
See application file for complete search history.

(56) References Cited

U.S. PATENT DOCUMENTS

| 2010/0115296 A1* | 5/2010 | Inoue | G06F 1/266 713/300 |
| 2011/0264942 A1* | 10/2011 | Tsukamoto | G06F 1/266 713/324 |
| 2015/0134990 A1* | 5/2015 | Masuda | G06F 1/263 713/323 |

* cited by examiner

*Primary Examiner* — Albert Wang
(74) *Attorney, Agent, or Firm* — Schwegman Lundberg & Woessner, P.A.

(57) ABSTRACT

Systems and methods are provided to selectively provide power to a power supply line in a connector port. A power setting may be received, at a controller in an electronic device, for the connector port. The power setting may be set or changed by a processor in the electronic device. The power setting may be stored in a non-volatile storage. The controller may determine the power setting by reading the non-volatile storage. The controller may then apply the power setting to a switch using at least one control signal. The control signal selectively opens and closes the switch to respectively connect and disconnect a source of DC power to the power supply line in the connector port.

15 Claims, 6 Drawing Sheets

SELECTIVELY CONTROLLING POWER TO A CONNECTOR PORT

BACKGROUND

Universal Serial Bus (USB) is an industry standard, serial input-output (IO) bus, initially developed in the mid-1990s, that defines the cables, connectors and communications protocols used for connection, communication, and power supply between electronic devices. It is currently developed by the USB Implementers Forum (USB IF). In one configuration, a USB port provides a standard downstream port (SDP) capable of data transfers, that includes four conductors and connector pins: one for bus power (VBUS) at a nominal 5.0 V, two for data signals (Data− and Data+), and one for ground (Ground). USB power, supplied across VBUS and ground, is often sourced from upstream devices or hosts, and is consumed by downstream devices.

Another USB configuration provides a charging port. USB charging ports are divided into two further types: the charging downstream port (CDP), which has the data signals, and the dedicated charging port (DCP), which does not. Dedicated charging ports may be found on USB power adapters that convert utility power or another power supply (e.g., a car's electrical system) to run attached devices and battery packs. In yet another USB configuration, sleep-and-charge USB ports may be used to power or charge peripherals or electronic devices even when the host electronic device or computer is shutdown, so long as power is available to the USB port. Normally, when a computer is shutdown, the USB ports are powered down, preventing peripheral phones and other devices from operating or charging from USB power. Sleep-and-charge USB ports remain powered even when the computer is off. This feature has also been implemented on devices other than computing devices, such as some laptop docking stations, to allow device charging even when no laptop is present.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

While sleep-and-charge USB ports provide a beneficial capability for many electronic devices, for example various different types of computing devices, it is not always desirable for this capability to be enabled. For example, the default setting may be different from that preferred by the user, either providing unwanted power, or not providing power as preferred. Accordingly, users may prefer that this feature be configured according to user preference. A problem with this configurability, however, is that a processor-specified configuration or setting for the sleep-and-charge feature may be lost after the processor power is removed, or may draw excess power to keep the processor running simply to administer the configuration. In this case, the power setting will default to the hardware settings so that the user-preferred USB power setting may only be restored by booting the processor, so it may perform the tasks necessary to place the power setting back in the preferred state. The need to boot up the processor to reset the preferred power setting is, however, inconvenient in many cases, impractical in other cases, and unacceptable device behavior for some applications. As described herein below, there are described various example embodiments of systems and methods to solve this problem.

Figure 1:
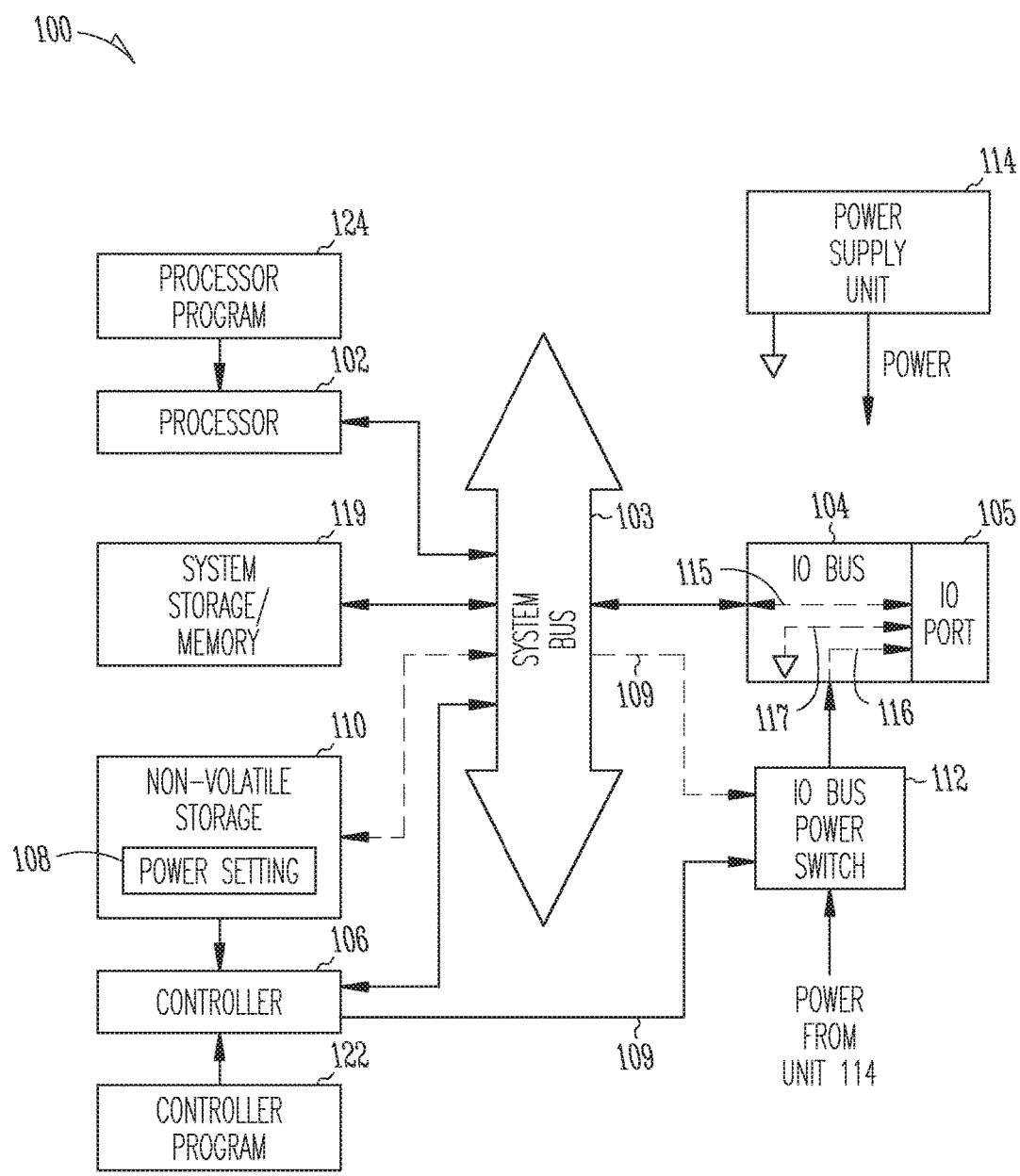
FIG. 1 illustrates is a block diagram of an example of an electronic device having an input-output bus with a controllable power option in accordance with some embodiments.

Referring now to FIG. 1, there is illustrated an example embodiment of an electronic device 100 having a processor 102, a system bus 103, and a cable connection interface— the cable connection interface comprising a connector port 105 having electrical contacts used to connect a bus cable to electronic device 100, and an input-output (IO) bus 104 having one or more data lines 115 connected to corresponding contacts in the connector port 105. Electronic device 100 further includes a power supply line 116 and a ground conductor 117 connected to supply power to corresponding conductors of the connector port 105, a controller 106, a power setting 108, control signal(s) 109, a non-volatile storage 110, a power switch 112—the power switch 112 including a switch control input—a power supply unit 114, a system storage/memory 119, a controller computer program 122, and a processor computer program 124. Each computer program 122 and 124 includes a plurality of executable computer instructions. Connector port 105 provides for connecting the IO bus conductors, including the data line(s) 115, to a bus cable connected to connector port 105. In one "power only" embodiment, described below, the data lines 115 are omitted or not connected to connector port 105, and only the power supply line 116 and ground conductor 117 are connected to the connector port 105.

In operation, electronic device 100 is capable of selectively providing power to the power supply line 116 by using power switch 112 to selectively couple power supply unit 114 across power supply line 116 and ground conductor 117. For this purpose, controller 106 obtains the power setting 108, stored in the non-volatile storage 110, and in response thereto, generates one or more of the control signal(s) 109, which are in turn used to control power switch 112 through its control input. Control signal(s) 109 either opens or closes the power switch 112 to connect or disconnect the power supply unit 114 from the power supply line 116. In one example embodiment, controller 106 is connected directly to the power switch 112, and in another embodiment, power switch 112 is connected to the system bus 103 (alternate connections are shown via dashed lines in FIG. 1), and the controller 106 communicates with power switch 112 through the system bus 103. In another example embodiment, non-volatile storage 110 is included in controller 106, and the processor 102 and controller 106 are communicatively coupled, when in operation, by the system bus 103. In another example embodiment, non-volatile storage 110 is external to the controller 106 and accessible by processor 102 over the system bus 103. In a further example embodiment, the processor 102 and controller 106 may be directly connected, as opposed to over the system bus 103. According to one example embodiment, control signal(s) 109 is a digital signal and in another example embodiment, is an analog signal.

According to one example embodiment, controller computer program 122 is stored in the non-volatile storage 110, and is executed by controller 106, to provide control of the power switch 112, as described further below. Further, the processor computer program 124 is stored in a system storage/memory 119, and is executable by the processor 102, as described further below. The power setting 108 may be stored in and retrieved from a non-volatile storage 110 by the controller 106, or if the non-volatile storage 110 is accessible to the processor 102, the power setting 108 may be set directly in non-volatile storage 110 by the processor 102.

In one example embodiment, the IO bus 104 is a serial bus with at least two data lines 115 (Data+ and Data−), and the processor 102 controls data transfers through the IO bus 104 with external devices connected to the IO bus 104 through connector port 105. In another example embodiment, as referred to above, no data lines are connected to the connector port 105, but instead only the power supply line 116 and ground conductor 117 are connected, such as provided by a USB charging port with no data transfer capability. According to another example embodiment, electronic device 100 is a workstation computer, a laptop computer, an Internet of Things (IoT) device, or any other electronic device with an IO bus that supplies power to an external device connected to the bus.

In one example embodiment, bus 104 may be a USB, and the connector port 105 may be a standard "female" USB connector of suitable variety. Bus 104 is in no way limited, however, to a USB, or a serial bus, and may be compliant with other standards or may be a non-standard or a proprietary bus. Further, in one example embodiment, the power supply unit 114 is an alternating current (AC) to direct current (DC) converter, and in another example embodiment, a battery, such as a rechargeable battery, that may be mounted in a chassis of the electronic device 100. According to another example embodiment, the power provided to the connector port 105 and to the processor 102 is obtained from a common source. In yet another example embodiment, the power supplied to the controller 106 is obtained from the same common source as well. In still another example embodiment, the processor 102 is a system on a chip (SoC) and the controller 106 is an embedded controller. According to still another example embodiment, the power switch 112 is contained within or is part of a USB controller chip or printed circuit board.

Figure 2:
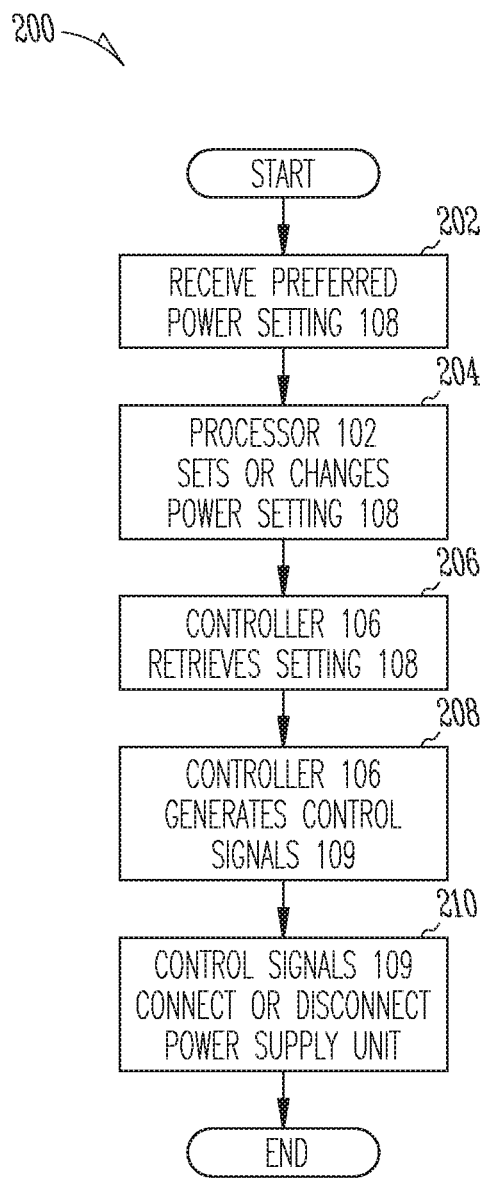
FIGS. 2-4 illustrate examples of processes to control a power option for an input-output bus in accordance with some embodiments.
Figure 5:
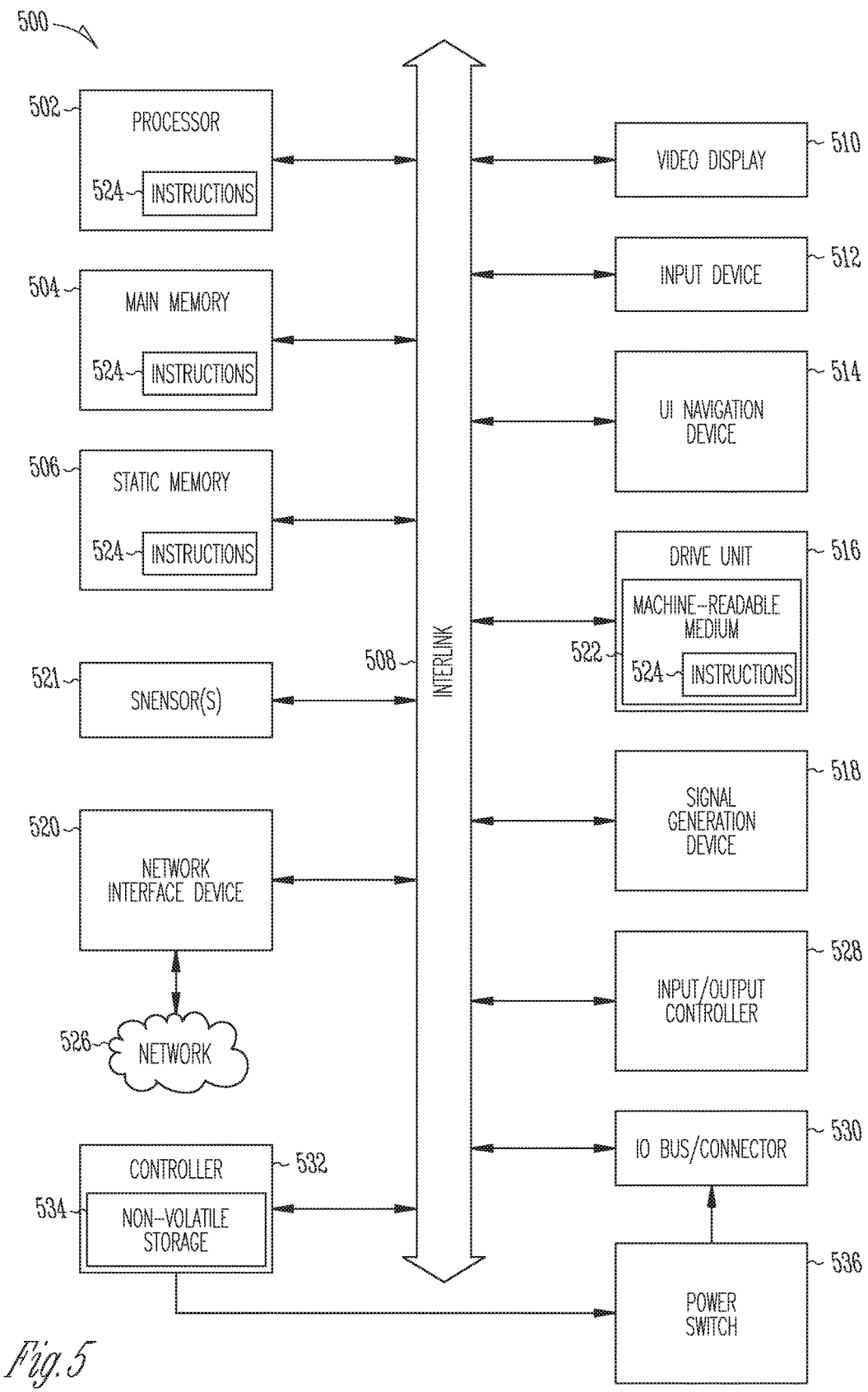
FIG. 5 illustrates generally a block diagram of another machine upon which any one or more of the techniques (e.g., methodologies) discussed herein may perform in accordance with some embodiments.

Referring now to FIG. 2, there is illustrated a process 200, implemented with computer programs 122 and 124, executable, respectively, by controller 106 and processor 102, to selectively provide power to connector port 105. In one example embodiment, processor 102 executes under control of the computer program 124 to set or change the power setting 108, for the connector port 105. According to one example embodiment, the power setting 108 may be a default setting from the basic input-output system (BIOS) for processor 102 or included in the firmware for controller 106 at build time. This power setting 108 may be received (operation 202) from user input supplied to the electronic device 100 through input devices (for example as shown in FIG. 5), from an external device or network connected to electronic device 100 through a network interface (for example as shown in FIG. 5), or may be otherwise provided to or determined by electronic device 100. The power setting 108 is stored (operation 204) in non-volatile storage 110. In one example embodiment, the power setting 108 is transferred from the processor 102 to the controller 106, and stored by controller 106 in the non-volatile storage 110. In another example embodiment, the power setting 108 is stored by the processor 102 in non-volatile storage 110, for example if such storage is accessible by the processor 102. According to another example embodiment, the controller 106 is an embedded controller that has a default power setting 108 programmed in its firmware, or receives the user preference for the power setting 108 from a previous successful power on self-test (POST) (e.g., from a basic input output system (BIOS), user extensible firmware interface (UEFI), etc.) procedure performed by processor 102. According to one embodiment, the controller 106, in response to power being supplied to the electronic device, is booted before the processor 102, and automatically determines the power setting 108 and applies the control signals 109 to the control input of the power switch 112 to place it the user-preferred state. Further, controller 106, in another embodiment, updates the state of the power switch 112 if the user preferred power setting 108 is altered at any time by processor 102.

After the power setting 108 is stored in the non-volatile storage 110, controller 106 may retrieve (operation 206) the power setting 108, and use it to generate (operation 208) the at least one control signal 109, which is in turn used to control power switch 112, in order to open it or close the power switch 112. Accordingly, the power setting 108 is used to connect or disconnect (operation 210) the power supply unit 114 to and from the power supply line 116. According to one example embodiment, the power setting 108 is effective to control USB power or a USB charging option when the electronic device is in a G2 (S5) (e.g., Soft Off state)—as defined in the Advanced Configuration and Power Interface Specification (ACPIS)—where the power supply unit 114 and other components may remain powered so the computer may "wake" on input from the keyboard, clock, modem. LAN, or USB device. According to another example embodiment, because a "default" value of the power setting 108 may be stored in the non-volatile storage 110 or directly in the firmware for controller 106, the controller 106 has access to a power setting 108 even if the processor 102 is not powered on.

Figure 3:
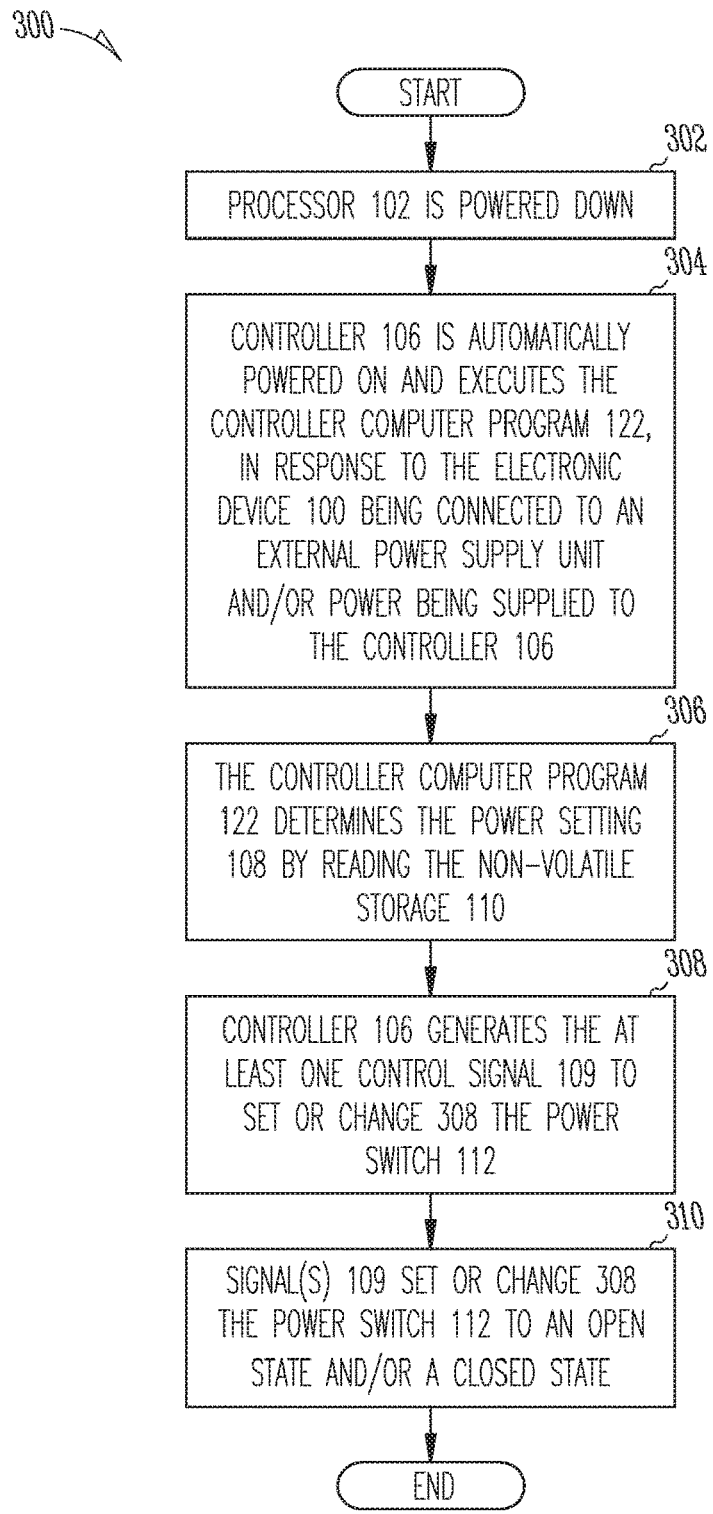

Referring now to FIG. 3, there is illustrated an example embodiment of a process 300 wherein the controller 106 generates the at least one control signal 109 at a time when the processor 102 is incapable of controlling or changing the power setting 108. The processor 102 may be incapable, in this regard, for example as a result of being fully powered off. Alternatively, for example, the processor 102 may be in a state of reduced power consumption—as compared to the level of power consumption during a time the processor 102 executes computer program 124—such that the processor is incapable of providing the control signal. For example, the processor may be powered on, in response to a user activating a mechanical switch mounted to the chassis of the electronic device 100, and fully powered off as a result of a loss of power supplied to the processor, by disconnecting the electronic device 100 from a source of external power such as AC line voltage.

According to one example embodiment, following a point in time when the processor 102 is powered down (operation 302), controller 106 is automatically powered on and executes 304 the controller computer program 122, in response to the electronic device 100 being connected to an external power supply unit and/or power being supplied to the controller 106 (operation 304). For example, at this point in time, processor 102 is powered off or is otherwise not operationally capable to perform processor operations—such as when the electronic device 100 is in the G2 state (as defined in the ACPIS)—entered after the electronic device 100 was in the G3/mechanical off state (as defined in the ACPIS). In this example embodiment, the controller computer program 122 determines the power setting 108 by reading (operation 306) the non-volatile storage 110, and generating (operation 308) the at least one control signal 109 to set or change (operation 310) the power switch 112 to an open state and/or a closed state. According to one example embodiment, the power switch 112 assumes a default state or position following loss of power to the electronic device 100, and the controller 106 changes the power switch 112 from the default state or position to the other state or position specified by the power setting 108.

Figure 4:
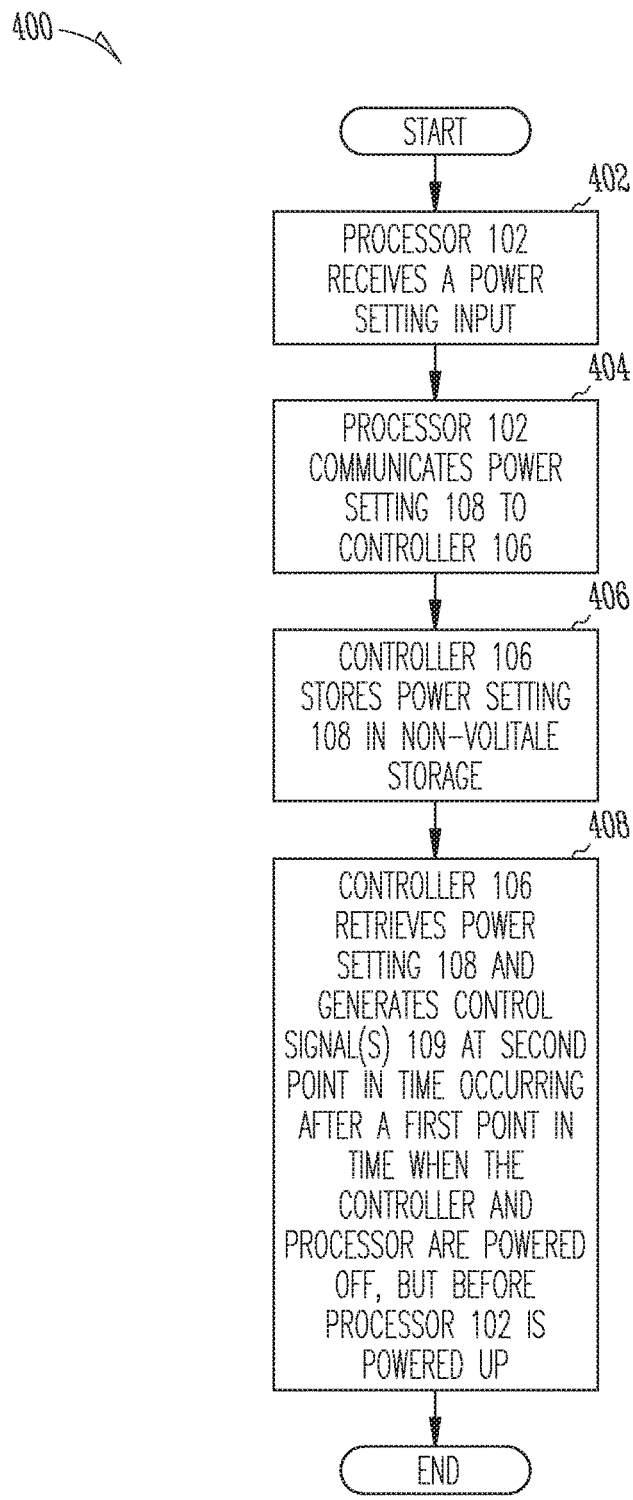

According to another example process 400 illustrated in FIG. 4, at another time when the processor 102 is operational, the processor computer program 124 executes on the processor 102 and receives (operation 402) a power setting input from a user or other source, such as through the input device(s), or over a network connection (for example as shown in FIG. 5), and communicates (operation 404) with the controller 106, or non-volatile storage 110, depending on the implementation option as referred to above, to set 406 the power setting 108. According to one example embodiment, controller 106 may change the control signal 109 immediately, after receive the power setting 108 from processor 102. Accordingly, the setting may be applied in the same boot and it is not necessary to wait to a next boot, in this embodiment. According to another example embodiment, the controller 106 initiates (operation 408) execution of the controller computer program 122 at a second point in time immediately (e.g., as soon as possible) following a first point in time during which both the controller 106 and the processor 102 are in a powered-off state. Here, the second point in time occurs before the processor computer program 124 is first executed by the processor 102 following being booted up.

According to still another example embodiment, default values may be provided for various system settings in the BIOS (or UEFI) for processor 102 and the firmware embedded in controller 106. Accordingly, these default values may be created or stored in the non-volatile storage 110 when the BIOS or embedded controller firmware first execute. As also described above, a default value for power setting 108 may be provided in the BIOS for processor 102 and controller 106 firmware, so that controller 106 may use the power setting 108 even before it receives the first user-preferred power setting 108 from the processor 102. According to another example embodiment, controller 106 changes the control signal 109 immediate after it receives a power setting 108 from processor 102, and at the same time (e.g., simultaneously, as soon as possible, or before any other entity may observe a difference between receipt and storage of the change), stores the setting 108 into non-volatile storage 110.

FIG. 5 illustrates generally an example of a block diagram of an alternate embodiment of an electronic device, referred to as a machine 500, upon which any one or more of the techniques (e.g., methodologies) and architectural features discussed hereinabove may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an input/output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

According to one example embodiment, machine 500 includes an IO bus and connector port 530 such as IO bus 104 and/or connector port 105 described above with respect to FIGS. 1-4, and any of the various above-described example and alternate embodiments thereof. Further included is a controller 532, such as controller 106 described above with respect to FIGS. 1-4, and any of the various above-described example and alternate embodiments thereof. Further, controller 532, in one example embodiment, includes a non-volatile storage 534, to store the power setting 108 described above with respect to FIGS. 1-4. In another example embodiment, controller computer program 122 is stored in non-volatile storage 534, or in one or more other storage or memory devices 504, 506 or 516, of machine 500. Further, in another example embodiment, processor computer program 124 is stored in processor 502, or in one or more other storage or memory devices 504, 506 or 516, of machine 500. Further, there is included a connector port switch 536, which connects a power supply unit (not shown) to the connector port, and is controlled by one or more control signals 538 generated by controller 532, as described above with respect to signal(s) 109 and FIGS. 1-4, and any of the various above-described example and alternate embodiments thereof.

Figure 6:
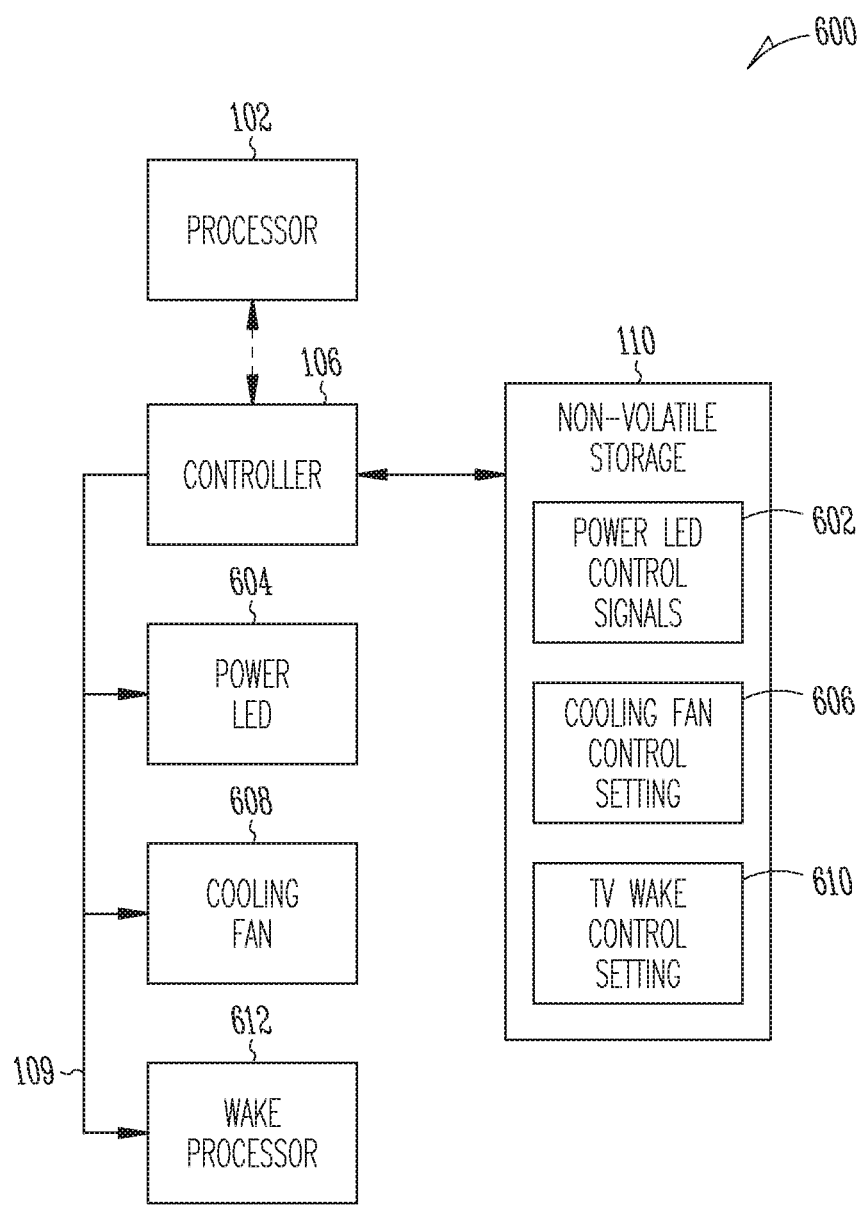
FIG. 6 illustrates alternate embodiments of an electronic device with user-specified options in accordance with some embodiments.

According to other alternate embodiments, the various above described systems and processes for controlling the setting for switch 112 may be used to control other settings and devices in electronic device 100. For one example, as illustrated in the diagram 600 of FIG. 6, a power LED control settings 602 may be stored in non-volatile storage 110, in the same manner as setting 108. Power LED control settings 602 is used by controller 106 to control a power LED 604 on electronic device 100. For example, a user may accordingly set a preferred color, brightness and/or blink pattern for different system power states, wherein settings 602 are stored in non-volatile storage 110, and used as described above with respect to the connector port 105 power setting, so the power LED 604 behavior is correct when the electronic device 100 is powered on.

According to another example embodiment, controller 106 and non-volatile storage 110 are used as described above to establish cooling fan control setting 606, to control a cooling fan 608 on electronic device 100. For example, some users prefer to turn off the cooling fan 608 when the processor 102 temperature is low. For this purpose, fan control setting 606 allows controller 106 to set the cooling fan 608 into the desired user-preferred mode so the cooling fan 608 remains off after a G3 boot.

In still another example embodiment, controller 106 and non-volatile storage 110 are used as described above to establish a "system wake from television (TV)" (HDMI CEC) TV wake control setting 610, to control whether processor 102 is waked when a system-detected TV is turned on. For this purpose, TV wake control setting 610 allows controller 106 to decide if it has to wake the processor 612 when it detects the TV is turned on from a TV off state.

Thus, according to another example embodiment, it shall be understood that the various embodiments of the systems and processes described above with respect to FIGS. 1-5, and in particular processor 102, controller 106, non-volatile storage 110, setting(s) 108 and signal(s) 109, may be used to control the operational mode of any system component, such as but not limited to the respective examples described above, namely switch 112, power LED 604, cooling fan 608 and processor 102.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Additional Notes & Examples

Example 1 is a system for selectively controlling power to a connector port, the system comprising: a switch to respectively connect and disconnect a source of direct current (DC) power to a power supply line in the connector port, the switch including an input control; and a controller, in an electronic device that includes the switch and the connector port, to: receive a power setting for the connector port, wherein the power setting is set or changed by a processor in the electronic device; store the power setting for the connector port in non-volatile storage, the non-volatile storage being accessible by the controller; determine the power setting by reading the non-volatile storage; and apply, in response to a determination of the power setting, at least one control signal to the control input on the switch to selectively open and close the switch.

In Example 2, the subject matter of Example 1 optionally includes the controller to, in response to power being supplied to the electronic device, automatically apply the at least one control signal at a time when the processor is incapable of establishing or changing the power setting of the connector port.

In Example 3, the subject matter of Example 2 optionally includes wherein the processor is incapable of providing the power setting to the controller as a result of being fully powered off and not yet booted up to a state of operation in which the processor can set or change the power setting.

In Example 4, the subject matter of Example 3 optionally includes wherein the processor is fully powered off as a result of a loss of power supplied to the electronic device.

In Example 5, the subject matter of any one or more of Examples 1-4 optionally include wherein the controller determines and applies the power setting in response to the electronic device being connected to an external power supply unit.

In Example 6, the subject matter of any one or more of Examples 1-5 optionally include wherein the controller includes the non-volatile storage.

In Example 7, the subject matter of any one or more of Examples 5-6 optionally include a processor computer program executing on the processor, to: receive a power setting input from a user of the electronic device or from another source; and communicate with the controller to set the power setting for the connector port.

In Example 8, the subject matter of Example 7 optionally includes wherein the power provided to the connector port and to the processor is obtained from a common source.

In Example 9, the subject matter of any one or more of Examples 7-8 optionally include the controller computer program executing on the controller at a second point in time following a first point in time during which both the controller and the processor are in a powered-off state, the second point in time occurring before the processor computer program is first executed by the processor following being booted up.

In Example 10, the subject matter of any one or more of Examples 1-9 optionally include wherein the switch assumes a default state following loss of power to the electronic device, and the controller computer program executes on the controller to change the switch from the default state.

In Example 11, the subject matter of any one or more of Examples 1-10 optionally include wherein the processor is a system on a chip (SoC) and the controller is an embedded controller.

In Example 12, the subject matter of any one or more of Examples 1-11 optionally include wherein the connector port is connected to an IO bus with at least one conductor designated as a power supply line and including at least one conductor used to carry data signals, and wherein the processor computer program executes on the processor to at least in part control data transfers on the IO bus.

In Example 13, the subject matter of any one or more of Examples 1-12 optionally include wherein the external power supply unit is an alternating current (AC)/DC power supply unit, and further comprising a battery included in the electronic device to provide power to the processor, controller or power supply line.

Example 14 is a method for selectively controlling power to a connector port, the method comprising: receiving, at a controller in an electronic device, a power setting for the connector port, wherein the power setting is set or changed by a processor in the electronic device; storing the power setting for the connector port in non-volatile storage, the non-volatile storage being accessible by the controller; determining, by the controller, the power setting by reading the non-volatile storage; and applying, by the controller in response to determining the power setting, at least one control signal to a control input on a switch to selectively close and open the switch to respectively connect and disconnect a source of direct current (DC) power to a power supply line in the connector port.

In Example 15, the subject matter of Example 14 optionally includes applying, automatically by the controller in response to power being supplied to the electronic device, the at least one control signal at a time when the processor is incapable of establishing or changing the power setting of the connector port.

In Example 16, the subject matter of Example 15 optionally includes wherein the processor is incapable of providing the power setting to the controller as a result of being fully powered off and not yet booted up to a state of operation in which the processor can set or change the power setting.

In Example 17, the subject matter of Example 16 optionally includes wherein the processor is fully powered off as a result of a loss of power supplied to the electronic device.

In Example 18, the subject matter of any one or more of Examples 14-17 optionally include the controller being powered on and executing a controller computer program in response to the electronic device being connected to an external power supply unit, and further wherein the determining of the power setting by the controller is performed by the controller computer program.

In Example 19, the subject matter of Example 18 optionally includes executing, by the controller, the controller computer program to generate the at least one control signal in order to change the switch between an open state and a closed state; and executing, by the processor, a processor computer program to: receive a power setting input from a user of the electronic device or from another source; and communicate with the controller to set the power setting for the connector port.

In Example 20, the subject matter of Example 19 optionally includes wherein the power provided to the connector port and to the processor is obtained from a common source.

In Example 21, the subject matter of any one or more of Examples 19-20 optionally include initiating, by the controller, execution of the controller computer program at a second point in time following a first point in time during which both the controller and the processor are in a powered-off state, the second point in time occurring before the processor computer program is first executed by the processor following being booted up.

In Example 22, the subject matter of any one or more of Examples 14-21 optionally include wherein the controller includes the non-volatile storage.

In Example 23, the subject matter of any one or more of Examples 14-22 optionally include wherein the switch assumes a default state following loss of power to the electronic device, and the controller changes the switch from the default state.

In Example 24, the subject matter of any one or more of Examples 14-23 optionally include wherein the processor is a system on a chip (SoC) and the controller is an embedded controller.

In Example 25, the subject matter of any one or more of Examples 14-24 optionally include wherein the connector port is connected to an IO bus with at least one conductor designated as a power supply line and including at least one conductor used to carry data signals, and wherein the processor at least in part controls data transfers on the IO bus.

In Example 26, the subject matter of any one or more of Examples 14-25 optionally include wherein the external power supply unit is an alternating current (AC)/DC power supply unit, and further comprising providing power to the processor, controller or power supply line from a battery included in the electronic device.

Example 27 is at least one machine readable medium including instructions that, when executed by processing circuitry, cause the processing circuitry to perform any method of Examples 14-26.

Example 28 is a system comprising means to perform any method of Examples 14-26.

Example 29 is a computer-readable media storing instructions that, when executed by a controller, cause the controller to: determine a power setting for a connector port on an electronic device, by reading a non-volatile storage; and generate, in response to the power setting, at least one control signal to a control input of a switch, the control signal selectively closing and opening the switch to respectively connect and disconnect a source of direct current (DC) power to a power supply line in the connector port.

In Example 30, the subject matter of Example 29 optionally includes wherein the instructions execute in response to power being supplied to the electronic device, to automatically apply the at least one control signal at a time when a processor of the electronic device is incapable of establishing or changing the power setting of the connector port.

In Example 31, the subject matter of Example 30 optionally includes wherein the processor is incapable of providing the power setting to the controller as a result of being fully powered off and not yet booted up to a state of operation in which the processor can set or change the power setting.

In Example 32, the subject matter of Example 31 optionally includes wherein the processor is fully powered off as a result of a loss of power supplied to the electronic device.

In Example 33, the subject matter of any one or more of Examples 29-32 optionally include wherein the controller is powered on and executes the instructions in response to the electronic device being connected to an external power supply unit, and further wherein the determining of the power setting by the controller is performed by the instructions executing on the controller.

In Example 34, the subject matter of any one or more of Examples 29-33 optionally include wherein the controller includes the non-volatile storage.

In Example 35, the subject matter of any one or more of Examples 33-34 optionally include instructions that, when executed by the processor, cause the processor to: receive a power setting input from a user of the electronic device or from another source; and communicate with the controller to set the power setting for the connector port.

In Example 36, the subject matter of Example 35 optionally includes wherein the power provided to the connector port and to the processor is obtained from a common source.

In Example 37, the subject matter of any one or more of Examples 35-36 optionally include wherein the instructions execute on the controller at a second point in time following a first point in time during which both the controller and the processor are in a powered-off state, the second point in time occurring before the instructions are first executed by the processor following being booted up.

In Example 38, the subject matter of any one or more of Examples 29-37 optionally include wherein the switch assumes a default state following loss of power to the electronic device, and the instructions execute on the controller to change the switch from the default state.

In Example 39, the subject matter of any one or more of Examples 29-38 optionally include wherein the processor is a system on a chip (SoC) and the controller is an embedded controller.

In Example 40, the subject matter of any one or more of Examples 29-39 optionally include wherein the connector port is connected to an IO bus with at least one conductor designated as a power supply line and including at least one conductor used to carry data signals, and wherein the instructions execute on the processor to at least in part control data transfers on the IO bus.

In Example 41, the subject matter of any one or more of Examples 29-40 optionally include wherein the external power supply unit is an alternating current (AC)/DC power supply unit, and further comprising a battery included in the electronic device to provide power to the processor, controller or power supply line.

Example 42 is a system for selective input control on a switch of an electronic device, the system comprising: means for receiving, at a controller in an electronic device, a power setting for the connector port, wherein the power setting is set or changed by a processor in the electronic device; means for storing the power setting for the connector port in non-volatile storage, the non-volatile storage being accessible by the controller; means for determining, by the controller, the power setting by reading the non-volatile storage; and means for applying, by the controller in response to determining the power setting, at least one control signal to a input control on a switch, the control signal selectively closing and opening the switch to respectively connect and disconnect a source of direct current (DC) power to a power supply line in the connector port.

In Example 43, the subject matter of Example 42 optionally includes wherein the controller, in response to power being supplied to the electronic device, automatically applies the at least one control signal at a time when the processor is incapable of establishing or changing the power setting of the connector port.

In Example 44, the subject matter of Example 43 optionally includes wherein the processor is incapable of providing the power setting to the controller as a result of being fully powered off and not yet booted up to a state of operation in which the processor can set or change the power setting.

In Example 45, the subject matter of Example 44 optionally includes wherein the processor is fully powered off as a result of a loss of power supplied to the electronic device.

In Example 46, the subject matter of any one or more of Examples 42-45 optionally include wherein the controller is powered on and executes a controller computer program in response to the electronic device being connected to an external power supply unit, and further wherein the determining of the power setting by the controller is performed by the controller computer program.

In Example 47, the subject matter of any one or more of Examples 42-46 optionally include wherein the controller includes the non-volatile storage.

In Example 48, the subject matter of any one or more of Examples 46-47 optionally include means for executing, by the controller, the controller computer program to generate the at least one control signal in order to change the switch between an open state and a closed state; and means for executing, by the processor, a processor computer program to: receive a power setting input from a user of the electronic device or from another source; and communicate with the controller to set the power setting for the connector port.

In Example 49, the subject matter of Example 48 optionally includes wherein the power provided to the connector port and to the processor is obtained from a common source.

In Example 50, the subject matter of any one or more of Examples 48-49 optionally include means for initiating, by the controller, execution of the controller computer program at a second point in time following a first point in time during which both the controller and the processor are in a powered-off state, the second point in time occurring before the processor computer program is first executed by the processor following being booted up.

In Example 51, the subject matter of any one or more of Examples 42-50 optionally include wherein the switch assumes a default state following loss of power to the electronic device, and the controller changes the switch from the default state.

In Example 52, the subject matter of any one or more of Examples 42-51 optionally include wherein the processor is a system on a chip (SoC) and the controller is an embedded controller.

In Example 53, the subject matter of any one or more of Examples 42-52 optionally include wherein the connector port is connected to an IO bus with at least one conductor designated as a power supply line and including at least one conductor used to carry data signals, and wherein the processor at least in part controls data transfers on the IO bus.

In Example 54, the subject matter of any one or more of Examples 42-53 optionally include wherein the external power supply unit is an alternating current (AC)/DC power supply unit, and further comprising means for providing power to the processor, controller or power supply line from a battery included in the electronic device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for selectively controlling power to a connector port, the system comprising:
   a switch to respectively connect and disconnect a source of direct current (DC) power to a power supply line in the connector port, the switch including an input control; and
   a controller, in an electronic device that includes the switch and the connector port, to:
      receive a power setting for the connector port, wherein the power setting is set or changed by a processor in the electronic device;
      store the power setting for the connector port in non-volatile storage, the non-volatile storage being accessible by the controller;
      determine the power setting by reading the non-volatile storage; and apply, in response to a determination of the power setting, at least one control signal to the control input on the switch to selectively open and close the switch, wherein the controller determines and applies the at least one control signal in response to the electronic device being connected to an external power supply unit; and a processor computer program to execute on the processor, to:

receive a power setting input from a user of the electronic device or from another source; and communicate with the controller to set the power setting for the connector port; and wherein a controller computer program is to execute on the controller at a second point in time following a first point in time during which both the controller and the processor were in a powered-off state, the second point in time occurring before the processor computer program is first executed by the processor following being booted up.

2. The system of claim 1, further comprising the controller to, in response to power being supplied to the electronic device, automatically apply the at least one control signal at a time when the processor is incapable of establishing or changing the power setting of the connector port.

3. The system of claim 2, wherein the processor is incapable of providing the power setting to the controller as a result of being fully powered off and not yet booted up to a state of operation in which the processor can set or change the power setting.

4. The system of claim 1, wherein the controller includes the non-volatile storage.

5. The system of claim 1, further wherein the connector port is connected to an IO bus with at least one conductor designated as a power supply line and including at least one conductor used to carry data signals, and wherein the processor computer program executes on the processor to at least in part control data transfers on the IO bus.

6. A method for selectively controlling power to a connector port, the method comprising:

receiving, at a controller in an electronic device, a power setting for the connector port, wherein the power setting is set or changed by a processor in the electronic device;

storing the power setting for the connector port in non-volatile storage, the non-volatile storage being accessible by the controller;

determining, by the controller, the power setting by reading the non-volatile storage;

applying, by the controller in response to determining the power setting, at least one control signal to a control input on a switch to selectively close and open the switch to respectively connect and disconnect a source of direct current (DC) power to a power supply line in the connector port;

executing a controller computer program by the controller, in response to the electronic device being connected to an external power supply unit, wherein the determining of the power setting by the controller is performed by the controller computer program;

executing, by the controller, the controller computer program to generate the at least one control signal in order to change the switch between an open state and a closed state;

executing, by the processor, a processor computer program to:

receive a power setting input from a user of the electronic device or from another source; and communicate with the controller to set the power setting for the connector port; and initiating, by the controller, execution of the controller computer program at a second point in time following a first point in time during which both the controller and the processor were in a powered-off state, the second point in time occurring before the processor computer program is first executed by the processor following being booted up.

7. The method of claim 6, further comprising applying, automatically by the controller in response to power being supplied to the electronic device, the at least one control signal at a time when the processor is incapable of establishing or changing the power setting of the connector port.

8. The method of claim 7, wherein the processor is incapable of providing the power setting to the controller as a result of being fully powered off and not yet booted up to a state of operation in which the processor can set or change the power setting.

9. The method of claim 6, wherein the controller includes the non-volatile storage.

10. The method of claim 6, further wherein the connector port is connected to an IO bus with at least one conductor designated as a power supply line and including at least one conductor used to carry data signals, and wherein the processor at least in part controls data transfers on the IO bus.

11. At least one non-transitory computer-readable media storing instructions that, when executed by a controller, cause the controller to:

determine a power setting for a connector port on an electronic device, by reading a non-volatile storage;

generate, in response to the power setting, at least one control signal to a control input of a switch, the control signal selectively closing and opening the switch to respectively connect and disconnect a source of direct current (DC) power to a power supply line in the connector port; and execute the instructions in response to the electronic device being connected to an external power supply unit;

wherein a processor is to: receive a power setting input from a user of the electronic device or from another source and communicate with the controller to set the power setting for the connector port; and wherein the instructions execute on the controller at a second point in time following a first point in time during which both the controller and the processor were in a powered-off state, the second point in time occurring before the instructions are first executed by the processor following being booted up.

12. The at least one non-transitory computer-readable media of claim 11, wherein the instructions execute in response to power being supplied to the electronic device, to automatically apply the at least one control signal at a time when a processor of the electronic device is incapable of establishing or changing the power setting of the connector port.

13. The at least one non-transitory computer-readable media of claim 12, wherein the processor is incapable of providing the power setting to the controller as a result of being fully powered off and not yet booted up to a state of operation in which the processor can set or change the power setting.

14. The at least one non-transitory computer-readable media of claim 11, wherein the controller includes the non-volatile storage.

15. The at least one non-transitory computer-readable media of claim 11, wherein the connector port is connected to an IO bus with at least one conductor designated as a power supply line and including at least one conductor used to carry data signals, and wherein the instructions execute on the processor to at least in part control data transfers on the IO bus.

* * * * *